United States Patent [19]

McClain et al.

[11] 4,100,335

[45] Jul. 11, 1978

[54] FINELY DIVIDED SAPONIFIED ETHYLENE-VINYL ACETATE INTERPOLYMERS

[75] Inventors: Dorothee M. McClain, Cincinnati, Ohio; Betty L. Vest, Covington, Ky.

[73] Assignee: National Distillers and Chemical Corp., New York, N.Y.

[21] Appl. No.: 721,743

[22] Filed: Sep. 9, 1976

Related U.S. Application Data

[63] Continuation of Ser. No. 564,198, Apr. 1, 1975, abandoned.

[51] Int. Cl.² .............................................. C08F 8/12
[52] U.S. Cl. ........................................ 526/10; 526/8; 526/11
[58] Field of Search ................................. 526/10

[56] References Cited

U.S. PATENT DOCUMENTS

| | | | |
|---|---|---|---|
| 2,467,774 | 4/1949 | Plambeck | 260/86 |
| 3,422,049 | 1/1969 | McClain | 260/29.6 |
| 3,547,858 | 12/1970 | Worrall | 260/87.3 |

FOREIGN PATENT DOCUMENTS

| | | | |
|---|---|---|---|
| 88,404 | 3/1972 | German Democratic Rep. | 526/10 UX |

*Primary Examiner*—Stanford M. Levin
*Attorney, Agent, or Firm*—Kenneth D. Tremain

[57] ABSTRACT

A process for the simultaneous saponification and dispersion of ethylene-vinyl acetate interpolymers into spherical particles having a number average particle size of about 10 microns or less is provided when an organic nitrogen base is used as the saponifying agent and a particular ethylene oxide-propylene oxide block copolymer is used as the dispersing agent.

9 Claims, No Drawings

FINELY DIVIDED SAPONIFIED ETHYLENE-VINYL ACETATE INTERPOLYMERS

CROSS-REFERENCE TO RELATED APPLICATION

This application is a continuation of application Ser. No. 564,198, filed Apr. 1, 1975, now abandoned.

BACKGROUND OF THE INVENTION

It is known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. (Hereinafter, the term "finely divided" will mean such spherical particles.) Thus, McClain U.S. Pat. No. 3,422,049 teaches that such dispersions of finely divided particles may readily be prepared by agitating the molten resin in admixture with water at elevated temperatures and at autogeneous pressure, in the presence of certain dispersing agents which are particular block copolymers of ethylene oxide and propylene oxide. The non-agglomerated spherical particles can be recovered as powders by cooling the dispersions below the fusion point of the resin and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the dispersion process a volatile, inert, water-soluble organic liquid that is soluble in the thermoplastic resin in an amount between 0.5 and 20 parts per 100 parts of the resin, whereupon a stable, aqueous, film-forming latex is ultimately obtained as the final product. Alternatively, U.S. Pat. No. 3,552,036 teaches that stable, film-forming aqueous latices of high molecular weight polyethylene can also be formed by including a liquid vinyl monmer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,432,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders has been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

The hydrolysis of ethylene polymers containing hydrolyzable copolymerized units, for example, vinyl acetate units, is also known in the art. Usually, the hydrolysis of such polymers is accomplished by the process of alcoholysis or transesterification in an alcoholic medium in the presence of an acid or basic catalyst, whereby the acetic ester of the alcohol employed is recovered as a by-product. Solution alcoholysis processes, i.e., in which the reaction is carried out in a mixed solvent of an aromatic hydrocarbon and lower primary alcohol, require the use of large volumes of solvent and alcohol and large reactors or kettles. The finished product must be recovered from solution and washed with additional alcohol. The time required to dissolve the resin before hydrolysis is long and the recovery procedure is also time consuming. In addition, the solvent-alcohol mixtures must be separated and recycled for re-use. Solvent losses are incurred which are undesirable from the view point of air pollution as well as for economic reasons. The inherent fire hazard in any process involving organic solvents is a further disadvantage of solution alcoholysis and, additionally, solvent shortages can also present problems.

A different process in which the ethylene-vinyl acetate copolymer in the form of pellets is hydrolyzed by alcoholysis in the swollen solid phase, in a substantially similar alcoholysis media, is described in U.S. Pat. No. 3,510,463. Pressure alcoholysis in the presence of sodium hydroxide in hexane-methanol and methanol alone at temperatures up to 230° C. has also been disclosed. (Japan. 70 33,065, Oct. 4, 1970; Chem. Abstrs. 74, 32375v and Japan. 70 33,066; Chem. Abstrs. 74, 54620y.)

Less commonly, the hydrolysis of ethylene-vinyl acetate copolymers is accomplished by the process of saponification, for example, in an aqueous emulsion where at least a stoichiometric amount of a strong base such as sodium or potassium hydroxide is required for the hydrolysis of a given number of moles of combined vinyl acetate units in the copolymer. See, e.g., U.S. Pat. No. 2,467,774. In general, however, saponification of ethylene-vinyl acetate copolymers is a slow process at ambient temperatures. Thus, Davies and Reynolds. J.Applied Polymer Sci. 12, No. 1, 47 (1968), have reported that at 25° C., 24 hours is required to effect an 18.1% saponification of an ethylene-vinyl acetate copolymer containing 50.8 weight percent vinyl acetate.

Thieme et al., in East German Pat. No. 88,404, describe a one-step dispersion and saponification of ethylene-vinyl acetate copolymers. This process is carried out in an aqueous media at 100°–260° C., under autogeneous pressure, in the presence of a one to two-fold stoichiometrically required amount of sodium or potassium hydroxide, optionally in the presence of an inert, water-soluble softening agent such as xylene, and in the presence of a surface active agent such as an alkyl sulfonate, an alkyl aryl sulfonate, an acyl derivative of N-methyl taurine, or an alkai salt of a higher carboxylic acid, or a non-ionic surfactant based on ethylene oxide (ethoxylated fatty alcohol). The East German patent does not disclose the particle size range of the product when the process was carried out without any added softening agent or surfactant. In fact, the product was actually milled before classification, and even after milling, the particle size range of the milled product was predominantly (97%) in the range of 125–1252 microns. When a surfactant was used, the unmilled classified product was still comparatively coarse. In the most favorable instance disclosed, employing an N-alkyl sulfonate surface active agent, 78.3% of the particles had diameters in the range of 125–1000 microns, whereas only 21.7% of the particles had diameters below 125 microns.

It is evident from the East German patent that the so-called "finely granulated" product produced therein is much coarser than the finely divided powders produced, for example, in the aforesaid McClain U.S. Pat. No. 3,422,049.

We have found that when the dispersion and saponification process of the East German patent is carried out using the ethylene oxide-propylene oxide block copolymers of the McClain patent, finely divided dispersions of the hydrolyzed copolymer are not obtained. Indeed, the particles have dimensions of 100 microns or more, and a portion of the particles are found to be irregular in shape (short fibers, agglomerates). Surprisingly, we have discovered that such finely divided dispersions can be obtained using the dispersion and saponification process of the East German patent and the ethylene oxide-propylene oxide block copolymers of the McClain patent if an organic nitrogen base is used as the saponification agent.

Accordingly, it is the object of this invention to provide a process for the saponification and dispersion of ethylene-vinyl acetate interpolymers into substantially spherical particles having an average particle size of about 10 microns or less and substantially devoid of particles greater than about 25 microns in size. This and other objects of the invention will become apparent to those skilled in the art from the following detailed description.

SUMMARY OF THE INVENTION

This invention relates to a process for producing finely divided saponified ethylene-vinyl acetate interpolymers and more particularly to a process for the simultaneous dispersion and saponification of ethylene-vinyl acetate interpolymers in an aqueous dispersion using an organic nitrogen base as the saponifying agent and an ethylene oxide-propylene oxide block copolymer as the dispersing agent.

DESCRIPTION OF THE PREFERRED EMBODIMENTS

In accordance with the present invention, the ethylene-vinyl acetate interpolymer in any convenient form, e.g., in the form of pellets, is first placed in a stirred pressure-resistant autoclave with water, which forms the continuous phase of the dispersion, and usually containing the dispersing agent dissolved therein. Therefore the agent or agents required for producing the saponification are added. The dispersing agent is a block copolymer of ethylene oxide-propylene oxide containing at least 50 weight percent ethylene oxide and the saponifying agent is an organic nitrogen base in an amount at least stoichiometrically equal to the amount of copolymerized vinyl acetate groups to be saponified. The overall process can be carried out in a single step or in a series of similar dispersion operations, the subsequent dispersion operations being carried out with or without the saponifying agent.

The ethylene-vinyl acetate interpolymers which are saponified and dispersed by the process of this invention are well known in the art. The interpolymers generally contain from about 1–70 weight percent vinyl acetate and range in number average molecular weight from about 1000 to 200,000. The ethylene-vinyl acetate interpolymers can optionally contain up to about 20 weight percent of a third comonomer polymerizable with the ethylene and vinyl acetate. Illustrative termonomers are methyl acrylate, methyl methacrylate, ethyl acrylate, ethyl methacrylate, propyl acrylate, propyl methacrylate, butyl acrylate, butyl methacrylate, dimethyl itaconate, diethyl itaconate, dimethyl-2-methylene glutarate, diethyl-2-methylene, dimethyl maleate, diethyl fumarate, dibutyl fumarate, and the like.

The dispersing agents emloyed in the present process are water-soluble block copolymers of ethylene oxide and propylene oxide having a molecular weight above about 3500 and containing at least 50% by weight of ethylene oxide. Such compounds are both stable and effective as dispersing agents at the temperatures employed in the present invention. Representative of such compounds are several of the non-ionic surface active agents marketed by Wyandotte Chemicals Co. prepared (see the Pluronic Grid Approach, Volume 11, Wyandotte Chemicals Co., 1957) by polymerizing ethylene oxide on the ends of a pre-formed polymeric base of polyoxypropylene. Both the length and molecular weight of the polyoxypropylene base and the polyoxyethylene end segments can be varied to yield a wide variety of products. For example, one of the compounds found to be suitable for the practice of this invention is Pluronic F-98, wherein a polyoxypropylene of average molecular weight of 2700 is polymerized with ethylene oxide to give a product of molecular weight of about 13,500. This product may be described as containing 20 weight percent of propylene oxide and 80 weight percent of ethylene oxide.

Further examples of suitable dispersing agents are Pluronic P-105 (MW 6500, 50% propylene oxide, 50% ethylene oxide), F-88 (MW 11,250, 20% propylene oxide, 80% ethylene oxide), F-108 (MW 16,250, 20% propylene oxide, 80% ethylene oxide), and P-85 (MW 4500, 50% propylene oxide, 50% ethylene oxide).

The saponifying agent employed is any of the organic nitrogen bases known heretofore to be effective in causing the replacement of an acetoxy group in the polymer by a hydroxyl group. Examples of organic nitrogen bases that can be employed include the strong organic bases such as tetramethyl ammonium hydroxide and tetramethyl guanidine, and weaker organic nitrogen bases such as ammonia, piperidine and alkyl amines such as methylamine, dimethylamine, trimethylamine, ethylamine, diethylamine and triethylamine, and alkanolamines such as ethanolamine, diethanolamine and triethanolamine, and diamines such as ethylenediamine and triethylenediamine.

The ethylene-vinyl acetate interpolymer to be dispersed and saponified is charged into a suitable reaction vessel together with water, the dispersing agent and the saponifying agent. The amount of water used is generally from about 0.33 to 9 parts by weight per part of the normally solid interpolymer, and preferably between about 0.8 to 4 parts of water per part of polymer. When preparing the mole dilute dispersions, it is usually more economical to dilute a more concentrated dispersion. Dispersions containing more than about 75% of polymer are generally quite viscous and difficult to handle.

To a limited extent, the dispersion becomes finer as the concentration of polymer increases, all other conditions being held constant.

The amount of organic nitrogen base saponifying agent employed is at least stoichiometric with respect to the amount of vinyl acetate units desired to be saponified. The degree of saponification obtained can be any desired amount from about 1–98%, with a degree of saponification ranging from about 15–80% being preferred. It is preferred to use a stoichiometric excess of base. Although as much as 20-fold of base for each mole of combined vinyl acetate units to be saponified can be used, it is preferred to use about 1.1–3 moles of base per mold of combined vinyl acetate units.

The amount of dispersing agent will generally range from about 0.5–25 parts by weight, preferably about 2–10 parts by weight, for each 100 parts of the normally solid copolymer. Larger amounts of dispersing agent exhibit no significant influence on the fineness of dispersion and tend to make subsequent removal of the dispersing agent from the polymer more difficult.

The dispersion operation is carried out at any temperature above the melting point of the ethylene-vinyl acetate copolymer and below the degradation temperature thereof. The dispersion temperature will generally range from about 115°–300° C. with temperatures of about 130°–230° C. being preferred. The pressure employed during the process of this invention will be autogeneous pressure at the particular temperatures.

The dispersing apparatus or device can be any device capable of delivering at least a moderate amount of shearing action under elevated temperatures and pressures to a liquid mixture. For example, conventional autoclaves equipped with conventional propeller stirrers are suitable. Propellers designed to impart greater shear to the mixture tend to improve the recovered yield of pulverant polymer but have little effect on the particle size and distribution thereof. The particle size and distribution are somewhat dependent on the stirring rate with higher stirring speeds resulting in finer and narrower dispersions until an optimum speed is reached above which there is little change. The overall recovery yield of the finely divided polymer is dependent upon the duration of stirring. For a given type and rate of stirring, a period of stirring exists within which a maximum recoverable yield of finely divided resin results. Either shorter or longer periods of shearing result in lower recoverable yields. The stirring periods can vary from as little as 1 second to as long as 2 hours with preferred stirring periods from about 1–30 minutes. It will be understood, however, that the stirring rates and periods will depend on the type of equipment utilized. Further, it will be recognized that while the rate and duration of agitation affects particle size and distribution and recoverable yields, these variables can be readily optimized for any given system through simple, routine experimentation.

The unique, finely divided spherical particles of hydrolyzed ethylene-vinyl acetate copolymers produced according to this invention are of value in many applications. Foremost among these, are those in the powder coating field, for example, as hard, transparent, adherent coatings on metal and glass surfaces. The finely divided state favors ease of application by electrostatic coating methods, where the spherical shape of the particles is believed to promote greater control of the coating process by virtue of more uniform charge distribution. In addition, the ultrafine particle size is a distinct advantage because it favors the deposition of coatings of minimal thickness, and consequently minimum coating costs. Other advantages of the hydrolyzed ethylene-vinyl acetate fine powders of this invention include the relative narrow particle size ranges which may be produced without classification. Classification is a particularly difficult procedure with powders having particle sizes as low as 10 microns. In general, the production of fine powders by the present invention is a simpler and less costly procedure than alternative powder forming operations such as grinding and spray drying.

The following Examples are set forth in order to further illustrate the invention. Throughout this specification and claims, all parts and percentages are by weight and all temperatures are in degrees centigrade unless otherwise specified.

EXAMPLES 1–10

To a stirred, pressure-resistant vessel, heated externally by means of a removable electrical heater was added 300 g of a 9 weight percent aqueous solution of Pluronic F-108 and 300 g of Elvax-150, a solid ethylene-vinyl acetate copolymer containing 32–34 weight percent of vinyl acetate. The vessel was rapidly heated to 200° C. whereupon the stirrer was started and stirring at 5000–10,000 rpm and heating were continued for 7 minutes at 200° C. Then, the rate of stirring was lowered and the vessel was allowed to cool to 120° C. whereupon the stirring was terminated. After the termperature had dropped to 90° C. the vessel was emptied, the product recovered by filtration, washed with water several times and dried. The particle size of the product was determined by means of a Coulter Counter, or microscopically. Several similar experiments were carried out under similar conditions varying the temperature and the resin used in an effort to effect simultaneous saponification and dispersion of the ethylene-vinyl acetate copolymers used without the addition of a saponifying agent. The results are shown in Table I.

TABLE I

| Copolymer | | Dispersion Addition | | Product | |
|---|---|---|---|---|---|
| Designation | wt. % Vinyl Acetate | Temp. ° C. | Time/ Min. | Finely Divided | Wt. % Saponification |
| Elvax-150 | 32–34 | 200 | 7 | Yes | 0.22 |
| Elvax-250 | 27–29 | 200 | 7 | Yes | 0.09 |
| Elvax-150 | 32–34 | 225 | 7 | Yes | 0.62 |
| Elvax-150 | 32–34 | 250 | 7 | Yes | 1.51 |
| Elvax-220 | 27–29 | 200 | 7 | Yes | 0.51 |
| Elvax-220 | 27–29 | 250 | 7 | Yes | 2.51 |

The foregoing results demonstrate that a finely divided product, i.e., having an average particle size of 10 microns or less, could be obtained in an aqueous medium at elevated temperatures under the conditions of the present invention but that the degree of saponification is very small in the absence of a saponifying agent. When a strong inorganic base is used as the saponifying agent, as in the aforementioned East German patent, a significant degree of saponification can be obtained but the product is not finely divided as illustrated in the following Table II.

TABLE II

| Copolymer | | Dist., Water, ml | F-108/g | Saponifying Agent | | Conditions | | | | | Product | |
| | | | | | | Rapid Stirring | | | Slow Stirring | | | |
| Name | Amt/g | | | Formula | Amt/g | Temp/ °C | Time, min. | r.p.m. | Temp/ °C | Time, min. | Finely Divided | % Saponification |
|---|---|---|---|---|---|---|---|---|---|---|---|---|
| Elvax-220 | 150 | 273 | 18 | LiOH . 2H$_2$O | 39 | 200 | 7 | <10,000 | 200 | 90 | No | 90 |
| Elvax-150 | 300 | 271 | 27 | NaOH | 2 | 218–250 | 7 | 10,000 | to 100 | — | (1 large rubbery chunk) | — |
| Elvax-220 | 150 | 135 | 15 | NaOH | 10 | — | — | — | 200 | 90 | No | — |
| Elvax-220 | 150 | 137 | — | NaOH | 10 | — | — | — | 200 | 90 | No | — |

*Normal operational sequence involved rapid heating to temperature, high-speed stirring (where used) at temperature, slower stirring at temperature for indicated time, then slower stirring while cooling from temperature to 150° C., finally cooling to 90° C. and emptying (last two steps not shown in Table).

EXAMPLES 11–18

These Examples illustrate the simultaneous saponification and dispersion of ethylene-vinyl acetate copolymers into finely divided form when the process is carried out in the presence of an organic nitrogen base as the saponifying agent.

The process used to prepare the saponified polymers of Table I was repeated in the additional presence of variable amounts of a nitrogen base. The results are summarized in Table III.

TABLE III

| Copolymer | Saponifying Agent | Amount Added mole | Process Temp., °C | Product | |
| | | | | Dispersion | Wt. % Saponification |
|---|---|---|---|---|---|
| Elvax 150 | NH$_4$OH | 0.05 | 185–200 | Yes | 4.0 |
| Elvax 150 | NH$_4$OH | 0.05 | 210–250 | Yes | 4.5 |
| Elvax 150 | NH$_4$OH | 0.50 | 210–250 | Yes | 39.4 |
| Elvax 150 | NH$_4$OH | 0.50 | 210–250 | Yes | 40.0 |
| Elvax 150 | Dimethyl aminoethanol | 0.50 | 214–250 | Yes | 4.2 |
| Elvax-220 | Dimethyl aminoethanol | 0.50 | 210–250 | Yes | 7.1 |
| Elvax-220 | Piperidine | 0.50 | 200* | Yes | 13 |
| Elvax-220 | Tetramethyl guanidine | 0.46 | 200* | Yes | 21.4 |

*Held for 90 minutes at 200° C. with slow stirring after the initial 7-minute rapid stirring period.

Various changes and modifications can be made in the process of this invention without departing from the spirit and the scope thereof. The various embodiments set forth herein were intended to be illustrative and were not intended as limiting.

We claim:

1. A process for the simultaneous saponification and dispersion of an ethylene-vinyl acetate interpolymer into a finely divided form which consists essentially of subjecting a mixture of said interpolymer in molten form and water to vigorous agitation at a temperature below the degradation temperature of said interpolymer in the presence of from 0.5 to 25 parts by weight per 100 parts of interpolymer of a water-soluble block copolymer of ethylene oxide and propylene oxide having a molecular weight above about 3500 and containing at least 50% by weight of ethylene oxide, and in the presence of at least a stoichiometric amount relative to the amount of vinyl acetate units to be saponified, of an organic nitrogen base saponifying agent; cooling the resulting dispersion to below the softening temperature of the resulting saponified interpolymer; and recovering a finely divided dispersion of said interpolymer in which the particles are substantially spherical in shape, exhibit a number average particle size below about 10 microns and are substantially devoid of particles in excess of about 25 microns in diameter.

2. The process of claim 1 wherein said interpolymer consists essentially of ethylene and vinyl acetate units.

3. The process of claim 1 wherein said organic nitrogen base saponifying agent is at least one member of the group consisting of tetramethyl ammonium hydroxide, tetramethyl guanidine, ammonia, methylamine, dimethylamine, trimethylamine, ethylamine, diethylamine, piperidine, triethylamine, ethanolamine, diethanolamine, triethanolamine, ethylenediamine, and triethylenediamine.

4. The process of claim 1 wherein said mixture contains about 0.33 to 9 parts by weight of water per part of interpolymer, about 0.5 to 25 parts by weight of dispersing agent per 100 parts of interpolymer, and a stoichiometric excess of said organic nitrogen base with respect to the amount of saponification desired, and wherein said vigorous agitation is conducted at a temperature of about 115°–300° C.

5. The process of claim 4 wherein said mixture contains about 0.8 to 4 parts of water per part of polymer, about 2 to 10 parts of dispersing agent per 100 parts of interpolymer, and about 1.1–3 times the stoichiometric amount of base, and wherein said temperature is about 130°–230° C.

6. The process of claim 1 wherein said nitrogen base is ammonia.

7. The process of claim 1 wherein said nitrogen base is dimethanolamine.

8. The process of claim 1 wherein said nitrogen base is piperidine.

9. The process of claim 1 wherein said nitrogen base is trimethyl guanidine.

* * * * *